US009469135B2

(12) United States Patent
Weijkamp

(10) Patent No.: US 9,469,135 B2
(45) Date of Patent: Oct. 18, 2016

(54) PRINTING SYSTEM AND METHOD OF PRINTING A MULTILAYER STRUCTURE USING RADIATION CURABLE INK

(71) Applicant: OCE-TECHNOLOGIES B.V., Venlo (NL)

(72) Inventor: Clemens T. Weijkamp, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 14/718,356

(22) Filed: May 21, 2015

(65) Prior Publication Data

US 2015/0336410 A1    Nov. 26, 2015

(30) Foreign Application Priority Data

May 22, 2014 (EP) .................................... 14169480

(51) Int. Cl.
| | |
|---|---|
| *B41J 29/38* | (2006.01) |
| *B41J 11/00* | (2006.01) |
| *B29C 67/00* | (2006.01) |
| *B41M 5/00* | (2006.01) |
| *B41M 7/00* | (2006.01) |
| B41M 3/00 | (2006.01) |
| *B41M 3/16* | (2006.01) |
| B33Y 10/00 | (2015.01) |
| B33Y 30/00 | (2015.01) |

(Continued)

(52) U.S. Cl.
CPC ............ *B41J 29/38* (2013.01); *B29C 67/0059* (2013.01); *B41J 11/002* (2013.01); *B41J 11/0015* (2013.01); *B41M 5/0047* (2013.01); *B41M 5/0064* (2013.01); *B41M 7/0081* (2013.01); *B33Y 10/00* (2014.12); *B33Y 30/00* (2014.12); *B41M 3/008* (2013.01); *B41M 3/16* (2013.01)

(58) Field of Classification Search
CPC ...... B41J 29/38; B41J 11/0015; B41J 11/002
See application file for complete search history.

(56) References Cited

U.S. PATENT DOCUMENTS

| | | | | |
|---|---|---|---|---|
| 2010/0007692 | A1* | 1/2010 | Vanmaele | ........... B29C 67/0055 347/21 |
| 2012/0076999 | A1* | 3/2012 | Nakano | .................. B41M 3/008 428/203 |

(Continued)

FOREIGN PATENT DOCUMENTS

| | | |
|---|---|---|
| EP | 1 462 266 A1 | 9/2004 |
| EP | 2 161 137 A1 | 3/2010 |

(Continued)

*Primary Examiner* — Geoffrey Mruk
*Assistant Examiner* — Scott A Richmond
(74) *Attorney, Agent, or Firm* — Birch, Stewart, Kolasch & Birch, LLP

(57) ABSTRACT

A printing system and a method for printing a multilayer structure using radiation curable ink, the multilayer structure comprising multiple ink layers which are consecutively printed, and wherein a first printed ink layer of any two consecutively printed ink layers is cured before a subsequently printed ink layer is printed thereon, wherein at least one ink of multiple inks is selected for being used for printing the multilayer structure, said multiple inks comprising at least one first and at least one second radiation curable ink, wherein said at least one ink is selected in dependence on information about at least one property of the said at least one ink apart from color, wherein, of the multiple inks, at least the selected at least one ink and at least one of the at least one first ink are used for printing the multilayer structure; the physical property being e.g. an expansion/shrinkage property and/or an adhesion property.

13 Claims, 5 Drawing Sheets

(56) References Cited

U.S. PATENT DOCUMENTS

| | | |
|---|---|---|
| 2012/0282448 A1 | 11/2012 | Chretien et al. |
| 2014/0002520 A1 | 1/2014 | Roof et al. |
| 2014/0227494 A1* | 8/2014 | Furuhata ................. B32B 27/00 428/195.1 |

FOREIGN PATENT DOCUMENTS

| | | |
|---|---|---|
| EP | 2 161 312 A1 | 3/2010 |
| WO | WO 03/029366 A1 | 4/2003 |
| WO | WO 2004/050323 A1 | 6/2004 |
| WO | WO 2008/077850 A2 | 7/2008 |

* cited by examiner

PRINTING SYSTEM AND METHOD OF PRINTING A MULTILAYER STRUCTURE USING RADIATION CURABLE INK

BACKGROUND OF THE INVENTION

1. Field of the Invention

The invention relates to a method of printing a multilayer structure using radiation curable ink. Furthermore, the invention relates to a printing system, in particular an ink jet printing system, for printing a multilayer structure using radiation curable ink.

2. Description of the Related Art

WO 2008/077850 A2 describes a 3D-inkjet printing method comprising the steps of: providing two or more fluids having a different composition to an inkjet printer; mixing the two or more fluids in a controlled amount; and jetting the mixture of the two or more fluids with the inkjet printer onto a support; at least partially curing the jetted mixture by actinic radiation or electron beam; and repeating the steps of mixing, jetting and curing in order to build a 3D-relief on the support. In one example, the composition of mixture made in the mixing step is changed at least once for the step of repeating the steps.

WO 03/029366 A1 describes a UV curable composition useful for three-dimensional inkjet printing comprising at least one UV curable urethane (meth)acrylate resin; at least one wax; at least one (meth)acrylate diluent; at least one photoinitiator; and at least one polymerization inhibitor; wherein the amount of wax is sufficient to phase change the UV curable composition after jetting.

US 2012/0282448 A1 describes a method for fabricating a three-dimensional object including depositing a composition containing a cationically curable compound, a cationic photoinitiator, a radically curable compound, a radical photoinitiator, and a gellant upon a surface to create a three-dimensional object; and curing the composition.

EP 1462266 A1 describes a method for forming a three-dimensional relief image on a support using an ink jet system, the relief image having a lamination image laminated on a first layer image that is a two-dimensional image.

Using radiation curable ink, in particular UV curable ink, multilayer structures may be printed that can reach a considerable height as compared to conventionally printed images that are basically flat, or, at least, the height of which is generally disregarded. By repeatedly printing a layer on top of a previously printed, cured layer, a multilayer structure may be built up having a defined height. For example, the height may be more than 0.1 mm, in particular more than of 0.2 mm, and e.g. up to 10 mm. The height, i.e. the thickness of the printed structures, adds an extension in a further dimension to the two dimensional image, and, accordingly, such prints are termed 2.5D prints. They are distinguished from 3D structures in particular in that the extension in the third dimension is limited to a thickness above a receiving material, i.e. there are no openings below a printed layer. Furthermore, the printed structure may comprise an image, e.g. a color image.

When printing a multilayer structure having a specific height using radiation curable ink, e.g. a multilayer structure that is a part of a 2.5D print, mechanical stress between the structure and a receiving material may arise when the ink shrinks during the curing of the ink. A problem of mechanical stress may be particularly pronounced in thick structures having e.g. a height of 0.5 to 10 mm. This may cause a detachment of the printed structure or, in case of a thin and/or flexible receiving material, a deformation may occur.

Furthermore, mechanical stress between the printed structure and the receiving material may be caused by a thermal expansion coefficient difference between the ink and the receiving material. The mechanical stress accumulates along the lateral extension of the printed structure, so that the problem is particularly pronounced when printed structures have a large extension in one or two directions on the surface of the receiving material.

It is an object of the invention to provide a system and method that offer the possibility to alleviate the above mentioned problems.

SUMMARY OF THE INVENTION

According to the invention, this object is achieved by a method of printing a multilayer structure using radiation curable ink, the multilayer structure comprising multiple ink layers which are consecutively printed, and wherein a first printed ink layer of any two consecutively printed ink layers is cured before a subsequently printed ink layer is printed thereon, the method comprising the steps of:

(a) selecting at least one ink of multiple inks for being used for printing the multilayer structure, said multiple inks comprising at least one first radiation curable ink and at least one second radiation curable ink, wherein said at least one ink is selected in dependence on information about an expansion/shrinkage property of the said at least one ink, (b) printing the multilayer structure onto a receiving material, comprising printing and curing the ink layers, wherein, of the multiple inks, at least the selected at least one ink and at least one of the at least one first ink are used for printing the multilayer structure.

Thus, the structure to be printed is built up from multiple layers or sub-layers which are printed on top of each other.

The expansion/shrinkage property may be a curing expansion/shrinkage property and/or a thermal expansion/shrinkage property. A shrinkage is equivalent to a negative expansion. For example, the thermal expansion/shrinkage property may comprise a thermal expansion coefficient, e.g. a linear thermal expansion coefficient.

For example, the at least one ink may be selected in dependence on said information about an expansion/shrinkage property of the said at least one ink, and, optionally, information about at least one property of the receiving material, and/or, optionally, information about at least one property of the at least one first ink used for printing the multilayer structure. The at least one property may be one of at least on property apart from color, e.g. at least one physical property, e.g. at least one of an expansion/shrinkage property and an adhesion property. In particular, said at least one property of the at least one first ink may comprise at least one property apart from color, e.g. an expansion/shrinkage property.

Preferably, said expansion/shrinkage property of the at least one selected ink is different from the corresponding property of each of the at least one first ink used for printing the multilayer structure.

For example, at least one ink may be selected based of information about an expansion/shrinkage property of the ink, in order to at least partly counterbalance an effect of the at least one first ink to cause expansion/shrinkage mechanical stress between the multilayer structure and the receiving material by an opposing effect of the at least one selected ink. Thus, an undesired expansion/shrinkage property of the at least one first ink may be at least partly compensated by a different, preferably opposing, expansion/shrinkage property of the selected at least one ink.

Specific optional features of the invention are indicated in the dependent claims.

Preferably, a proportion of the amount of the at least one selected ink to the amount of the at least one first ink to be used for printing at least one layer of the multilayer structure is determined in dependence on an expansion/shrinkage property of the said at least one ink, and wherein said at least one layer of the multilayer structure is printed using the at least one selected ink and the at least one first ink in respective amounts according to the determined proportion. For example, the step of printing the multilayer structure may comprise setting ink density levels of the respective inks for printing said at least one layer, wherein the ink density levels are set in accordance with the determined proportion. This allows to fine tune the composition of the at least one layer.

For example, a proportion of the amount of the at least one selected ink to the amount of the at least one first ink to be used for printing at least one layer of the multilayer structure is determined in dependence on information about an expansion/shrinkage property of the ink. This may be done in order to at least partly counterbalance an effect of the at least one first ink to cause expansion/shrinkage mechanical stress between the multilayer structure and the receiving material by an opposing effect of the at least one selected ink. Determining the proportion allows to better tune the overall expansion/shrinkage property of the multilayered structure. For example, the amounts of the different inks used for printing the multilayer structure may be balanced in order to minimize an overall expansion/shrinkage property of the multilayer structure, and/or in order to adapt an overall expansion/shrinkage property of the multilayer structure to an expansion/shrinkage property of the receiving material. This has the advantage that a resulting mechanical stress between the multilayer structure and the receiving material may be reduced.

Different inks may be selected for different layers. Inks may be selected for different layers in dependence on respective properties. For example, at least one ink may be selected for being used for printing an elevation layer of the multilayer structure, and at least one ink may be selected for being used for printing an adhesion layer, as will be exemplarily described below.

Preferably, the at least one ink is selected independent of its possible chromatic color, in other words: independent of its chromatic color in the case it has a chromatic color, i.e. in particular a color apart from white, grey and black. For example, the at least one selected ink may be selected independently of its color. Preferably, said at least one ink is selected in dependence on information about at least one property of the said at least one ink apart from visual properties, such as, e.g., color or brightness.

For example, the step of selecting at least one ink may comprise selecting at least one ink of said multiple inks for printing an adhesion ink layer, wherein said at least one ink is selected in dependence on information about an adhesion property of the at least on ink and, optionally, in dependence on information about an adhesion property of the receiving material, and wherein the step of printing the multilayer structure comprises printing an adhesion layer on the receiving material, the adhesion layer forming a bottom layer of the multilayer structure connecting the multilayer structure to the receiving material. The selecting may be done in order to improve adhesion of the multilayer structure to the receiving material.

For example, the at least one first ink may be of a first type of ink, e.g. based on a first ink base formulation, and the at least one second ink may be of a second type of ink, e.g. based on a second ink base formulation different from the first ink base formulation. For example, said properties of the inks, e.g. the expansion/shrinkage properties and/or adhesion properties, may be mainly attributed to their respective ink base formulations. For example, one of the first and second ink base formulations may shrink during curing, and the other one of the ink base formulations may expand during curing.

For example, the step of printing the multilayer structure may comprise printing an elevation layer and printing a top layer of the multilayer structure, wherein the top layer comprises an image layer, and wherein, of the multiple inks, at least the selected at least one ink is used for printing the elevation layer, and at least one of the at least one first ink is used for printing the image layer, wherein the image layer is printed according to image data. For example, the at least one first ink used for printing the image layer may be selected in dependence on image information and/or a color of the respective ink. In other words, the method comprises the step of: selecting the at least one first ink of the multiple inks for being used for printing the image layer, wherein said selected at least one first ink is selected in dependence on image data and/or a color of the said at least one ink.

For example, a proportion of the amount of the at least one selected ink to the amount of the at least one first ink to be used for printing the elevation layer may be determined in dependence on the expansion/shrinkage property of the said at least one ink. Said proportion may be up to 100%. For example, each sub-layer of the elevation layer may be printed using the at least one selected ink and the at least one first ink according to said proportion. However, different sub-layers of the elevation layer may be printed according to different respective proportions of the amount of the at least one selected ink to the amount of the at least one first ink, and said determined proportion may be an overall proportion with respect to the elevation layer.

For example, the step of printing the multilayer structure may comprise printing an elevation layer and printing a top layer of the multilayer structure, wherein the top layer comprises an image layer and a uniformly colored cover layer that covers the elevation layer, and wherein the image layer is printed on to the cover layer, the cover layer separating the image layer from the elevation layer. Thus, a defined basis or support may be provided for the image layer. For example, the cover layer may be printed to form a continuous layer covering the elevation layer and, optionally, covering, at positions of optional gaps in the elevation layer, the receiving material.

Preferably, said at least one first ink has the property to expand or shrink during radiation curing, and said at least one second ink has an opposing property to shrink or, respectively, to expand during curing. Thus, a wide range of the overall expansion/shrinking property of the multilayer structure may be achieved as desired. Thus, expansion/shrinkage mechanical stress between the multilayer structure and the receiving material may be minimized. Furthermore, if it is desired to minimize expansion/shrinkage mechanical stress between the printed structure and the receiving material at a target temperature that is different from room temperature, then opposing expansion and, respectively, shrinkage curing effects may allow to better compensate for thermal expansion coefficient differences between the inks and the receiving material.

For example, said information about an expansion/shrinkage property may comprise information about a curing expansion/shrinkage property and information about a thermal expansion/shrinkage property. Preferably, at a target temperature, a combined effect of an expansion/shrinkage during curing of the at least one first ink used for printing the ink layers and a thermal coefficient difference between the printed first ink and the receiving material may be at least partly compensated by a different, preferably opposing, combined effect of an expansion/shrinkage during curing of the selected at least one ink used for printing the ink layers and a thermal coefficient difference between the printed selected ink and the receiving material. This is particularly advantageous, if it is desired to minimize expansion/shrinkage mechanical stress between the multilayer structure and the receiving material at a target temperature that is different from room temperature.

For example, the multilayer structure is printed by printing in multiple print swaths and curing after each print swath. For example, printing an ink layer of the multilayer structure, e.g. an ink layer in form of the image layer, the cover layer, the elevation layer, and/or the adhesion layer, may comprise printing at least one sub-layer forming said ink layer, wherein each sub-layer corresponds to a print swath of one or more print heads of a print engine. However, an ink layer may also be printed in more than one print swath and only then cured.

For example, each printed and cured layer, including sub-layer, of the multilayer structure may have a minimum thickness of 0.01 mm, preferably a minimum thickness of 0.02 mm. The multilayer structure may be a part of a 2.5D image. A height of the structure may be in the range of at least 0.1 mm, in particular at least 0.2 mm. The height may be up to 1 mm or more, e.g. up to 10 mm.

Preferably, the radiation curable inks are UV curable inks.

BRIEF DESCRIPTION OF THE DRAWINGS

Embodiment examples of the invention will now be described in conjunction with the drawings, wherein.

DETAILED DESCRIPTION OF EMBODIMENTS

Figure 1:
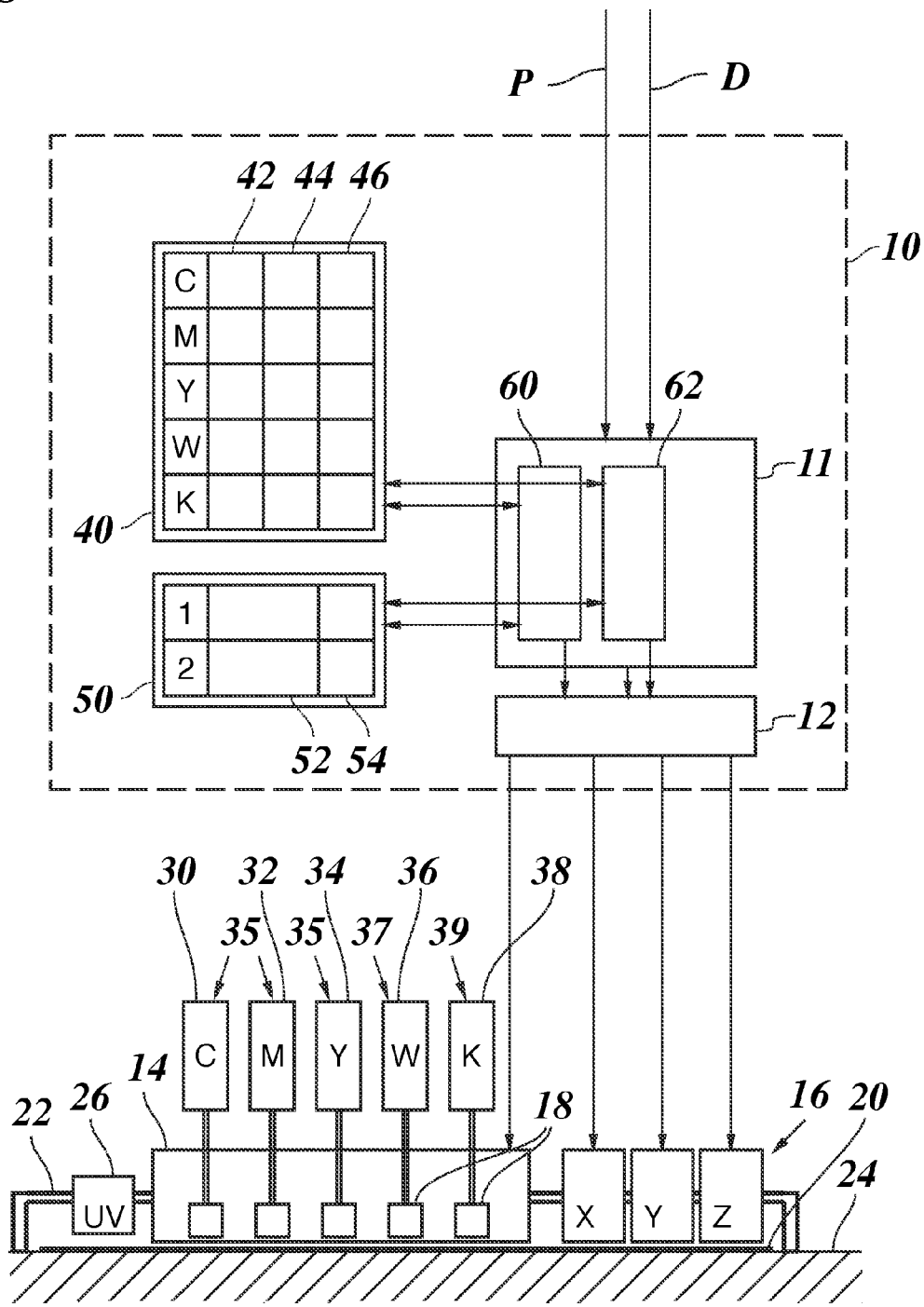
FIG. 1 is a block diagram of a printing system according to the invention.

The present invention will now be described with reference to the accompanying drawings, wherein the same or similar elements are identified with the same reference numeral.

FIG. 1 schematically shows a printing system for printing 2.5D prints using UV curable ink. A print data processing system 10 receives print data including image data P and height data D. The print data specifies, for two dimensional print coordinates X, Y, the image data P(X, Y) and associated height data D(X, Y). The height data D describes a height, i.e. a thickness, of the print in the third dimension Z.

The print data processing system 10 includes a layer definition unit 11 adapted to provide layer print data to a raster image processor 12 adapted to convert the layer print data into a format suitable for driving a print engine 14 synchronized with a motion control system 16 controlling relative motion between printheads 18 of the print engine 14 and a receiving material 20 or substrate. For example, the layer definition unit 11 generates layer print data for each layer to be printed from the print data P, D, in order to build up a multilayer structure according to the specified height information D. The height D may be specified as a physical dimension or as a number of layers.

The motion control system 16 comprises print carriage motion controllers for first and second printing directions X, Y and, optionally, a print carriage height controller Z for controlling a height of the printheads 18 above the receiving material 20. A printhead support 22 bridges the bed 24 of the flatbed printing system. A UV curing device 26 is mounted to the print engine 14 for traversing the receiving material 20 together with the printheads 18.

Multiple inks supply systems 30, 32, 34, 36, 38 are connected to respective printheads 18. FIG. 1 exemplarily shows ink supply systems 30, 32 and 34 for first chromatic inks 35 of the colors cyan (C), magenta (M) and yellow (Y), a further ink supply system 36 for a first achromatic, white ink 37 (W), and a further ink supply system 38 for a second, achromatic, black ink 39 (K). The first and seconds inks are chemically compatible to each other. In particular, they mix in the wet state. The first inks 35, 37 of the chromatic colors and white are based on a first ink base formulation. The second, black ink 39 is based on a different, second ink base formulation.

The print data processing system 10 includes an ink property memory unit 40 that stores, for each of the inks, information characterizing expansion/shrinkage properties of the respective ink. For each ink, there is stored information 42 about a curing expansion, or, respectively, a curing shrinkage of the ink, and information 44 about thermal expansion/shrinkage properties of the inks, e.g. the linear thermal expansion coefficient of each ink.

The print data processing system 10 optionally includes a receiving material property memory unit 50 adapted for storing information characterizing expansion/shrinkage properties of respective receiving materials. For example, there is stored, for two different receiving materials 1 and 2, expansion/shrinkage property information 52 in the form of the linear thermal expansion coefficient.

The print data processing system 10 includes an ink selector unit 60 and a proportion determining unit 62, the function of which will be explained below. In the following, printing of a multilayer structure having a height D will be exemplarily explained with respect to FIG. 2 and FIG. 3.

First Example

In a first example, a structure having a target thickness D of 0.2 mm is printed on a receiving material 20 in the form of thin polyester film having a thickness of 0.1 mm (Océ polyester MC500).

Figure 2:
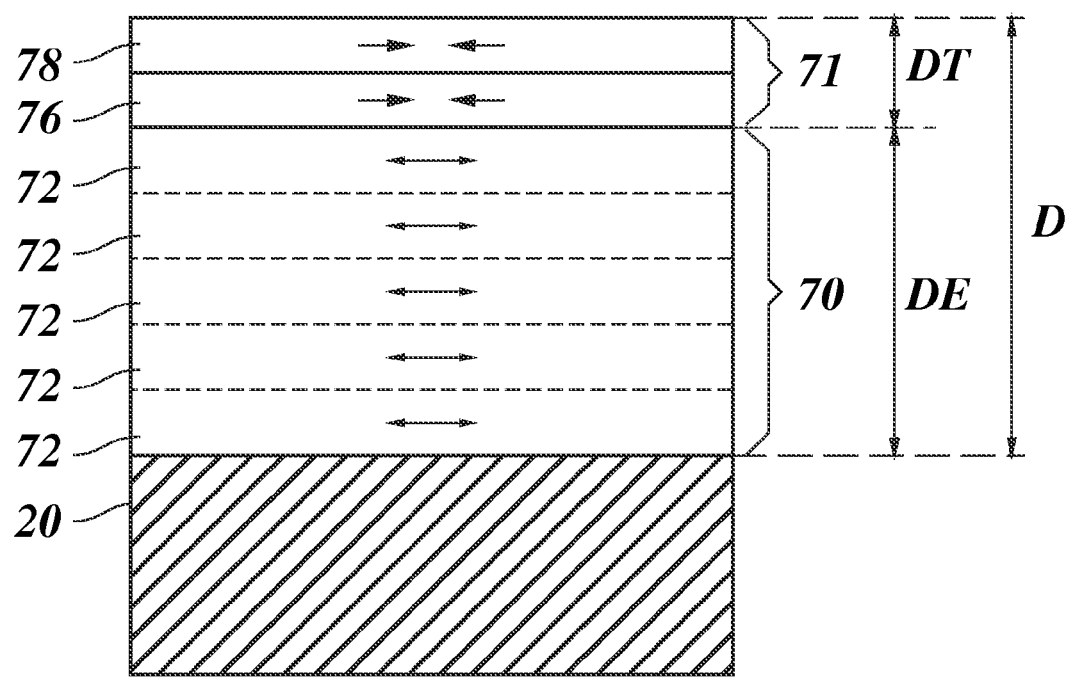
FIG. 2 is a schematic illustration of a 2.5D print for illustrating the invention.
Figure 3:
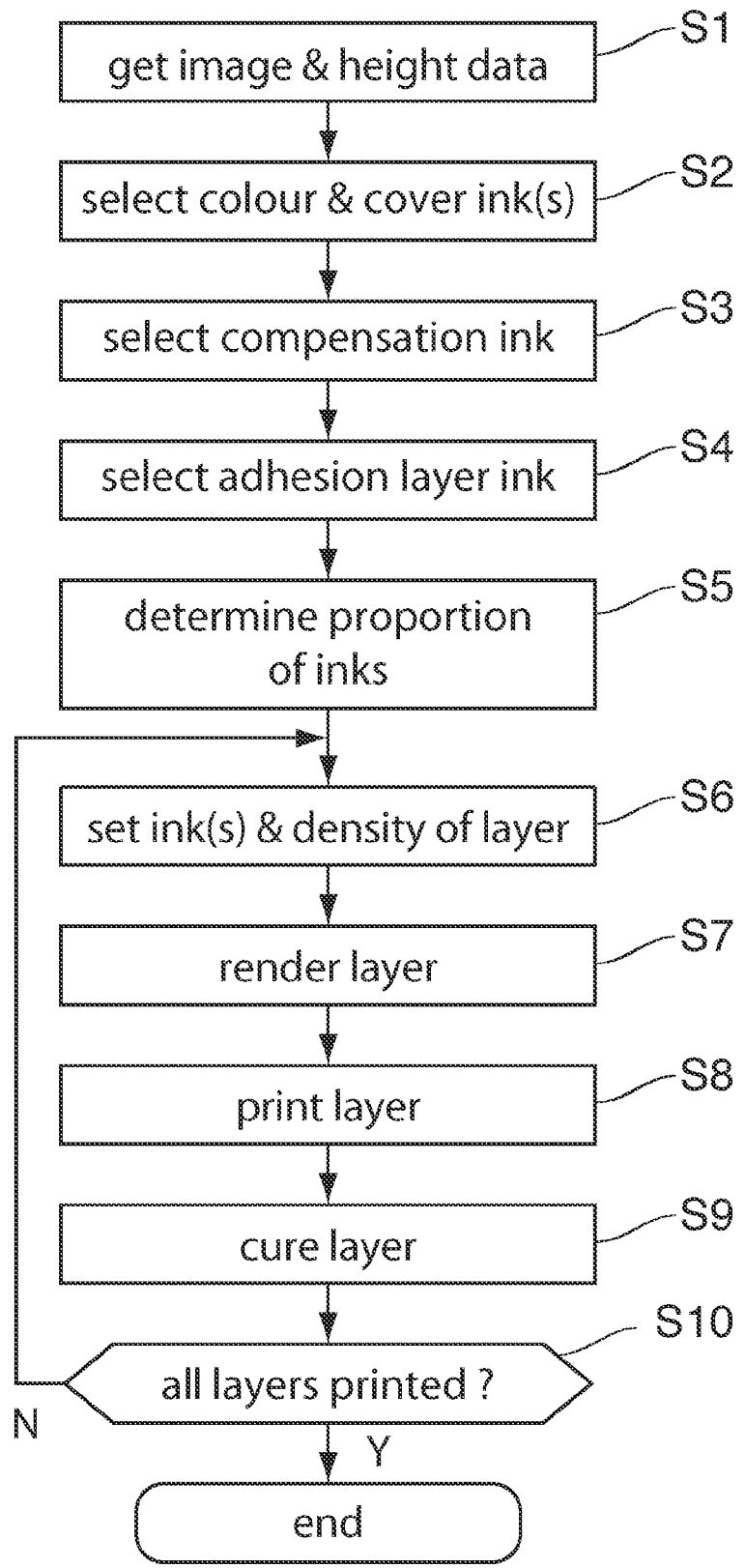
FIG. 3 is a flow diagram illustrating a method of printing a multilayer structure according to the invention.

The structure comprises an elevation layer 70 and a top layer 71. The elevation layer 70 comprises one or more sub-layers 72, which are schematically shown in FIG. 2. The top layer 71 comprises a white cover layer 76, which completely covers the top surface of the elevation layer 70, and an image layer 78 reproducing image data P. A thickness DT of the top layer 71 is determined by the average thickness of the image layer 78 and the e.g. constant thickness of the optional white cover layer 76.

The white cover layer 76 is printed using the first ink 37 (W). The image layer 78 is printed using the first inks 35 (C, M, Y) in accordance with the image information P. The inks 35, 37 (C, M, Y, W) used for the top layer 71 have substantially the same curing expansion/shrinkage property and undergo a shrinkage of 0.4% during curing. This is illustrated in FIG. 2 by arrows pointed towards each other in the respective layers. The top layer 71 has a thickness of DT=0.05 mm. For example, for printing the top layer 71, the inks C, M, Y, W may be Océ IJC255 UV curable inks having a first ink base formulation.

The thickness DE=0.15 mm of the elevation layer 70 is determined as DE=D−DT. The elevation layer 70 is built of multiple sub-layers 72 of a mixture of the first inks C, M, Y and the second ink K. The second ink has a curing expansion/shrinkage property in the form of a curing expansion of 2.0%. Thus, the second ink K has a curing expansion/shrinkage property that is opposed to the respective property of the first inks C, M, Y, W. For example, the second ink K is Océ IJC256 UV curable ink having a second ink base formulation.

The sub-layers 72 each are printed in one print swath of the printheads 18. In each print swath, the four first inks 35, 37 are printed with a standard ink density level of 100%, and the second ink 39 is also printed with a standard ink density level of 100%. The inks at least partly mix before they are cured.

Thus, for printing the elevation layer 70, the proportion of the amount of the second ink to the amount of the four first inks is 0.25, in other words: 1:4, i.e. the amount of the second ink is 20% and the amount of the four first inks is 80%.

Thus, the overall curing expansion of the elevation layer 70 is (0.8×−0.4%)+(0.2×2%)=0.08%. The curing expansion property of the sub-layers 72 is illustrated in FIG. 2 by diverging arrows.

The curing shrinkage of the white cover layer 76 and the color image layer 78 is: 1.0×−0.4%=−0.4%.

The resulting net expansion/shrinkage property of the total printed structure is, therefore: (0.15/0.2×0.08%)+(0.05/0.2×−0.4%)=−0.04%.

Thus, the absolute amount (0.04%) of the resulting expansion/shrinkage property is substantially reduced as compared to the absolute amounts of the respective expansion/shrinkage properties of the individual inks of 0.4% and 2.0%, respectively.

Printing is performed as follows.

The print data processing system 10 receives the color data specified in the image data P, and the height data D (step S1). The color inks C, M, Y for printing the image layer 78 are selected in accordance with the image information P (step S2). In the example, the printing system is equipped with chromatic colors C, M, Y of the Océ IJC255 type, only. Thus, the selection of the type of color inks is predetermined. Similarly, the white cover ink W is selected as predetermined.

Since the first inks have a curing shrinkage property, the second ink K having an opposing behaviour is selected as a compensation ink (step S3) by the ink selector unit 60. The optional step S4 is explained further below with reference to FIG. 8.

In dependence on the overall target thickness D and the known top layer thickness DT, the proportion determining unit 62 determines the proportion of the amount of the second ink to the amount of the four first inks to be used for printing the elevation layer 70 (step S5).

For example, the proportion may be optimized by determining the proportion iteratively by calculating a resulting net expansion/shrinkage of the multilayer structure for varying proportions of the inks, e.g. varying the number of first inks to be used together with one second ink for printing the elevation layer. However, the above formulas may also be rearranged for directly calculating the required curing expansion of the elevation layer and calculating the required proportion of the inks of the elevation layer, starting from the known curing shrinkage of the top layer 71.

In the example, by determining a proportion of 20% to 80%, as explained above, the curing shrinkage property of the first inks is at least partly compensated. In particular, the proportion is determined to substantially counterbalance the opposing curing expansion/shrinkage properties of the first and second inks K and C, M, Y, W used for printing the multilayer structure, i.e. the elevation layer 70 and the top layer 71.

For each layer or sub-layer to be printed, the ink(s) to be used, their proportion, and the dot density are determined similar as described above (step S6). The raster image processor 12 renders the layer (step S7). The layer is printed (step S8) and cured (step S9). The steps S6 to S9 are repeated (step S10) until all layers are printed.

Comparative Example

Figure 4:
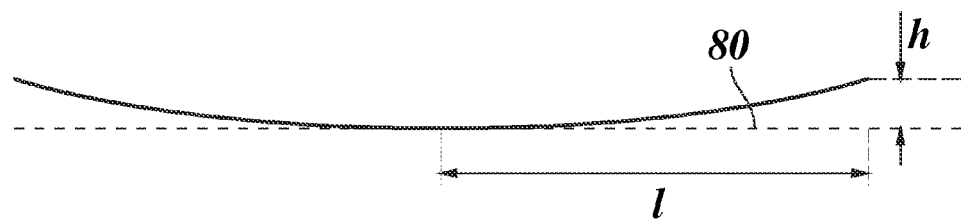
FIG. 4 is a comparative example of a printed thin film and is an example of deflection due to mechanical stress.

FIG. 4 shows a comparative example of a film having a constant thickness of 0.2 mm printed using the first ink 35 only. Due to the curing shrinkage of 0.4%, there is a mechanical stress between the printed structure and the underlying receiving material 20 in form of the thin polyester film. This mechanical stress causes a deflection of the product. The film bends upwards. For example, a test film of a length 2×l may show a distance h at its ends above a horizontal support 80.

Figure 5:
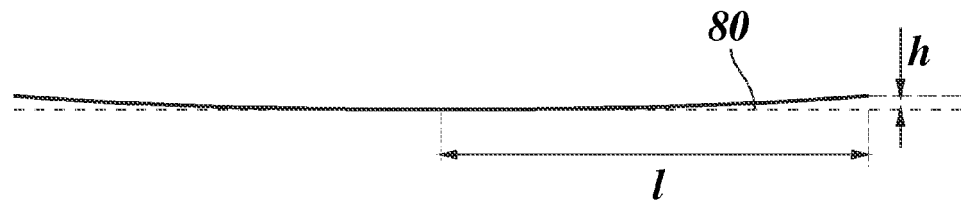
FIG. 5 is an example of a printed thin film having a reduced mechanical stress.

By selecting the second ink K, as explained above, and determining a proportion of the inks for printing the elevation layer 70, the deflection can be substantially reduced, as shown in FIG. 5.

Second Example

In a second example, the proportion may be fine tuned to counterbalance the expansion/shrinkage properties of the inks even better. For example, the proportion determining unit 62 may determine a proportion of 22.4% to 77.6% for the amount of the second ink K to the amount of the first inks for the elevation layer. That is, the elevation layer 70 contains 77.6% Océ IJC255 ink and 22.4% Océ IJC256 ink. Therefore, the expansion of the elevation layer 70 is (0.776×−0.4%)+(0.224×2%)=0.1376%.

As above, the shrinkage of the top layer 71 is 1.0×−0.4%=−0.4%.

The resulting total curing expansion of the printed structure is: (0.15/0.2×0.1376%)+(0.05/0.2×−0.4%)=0.003%.

For example, in order to achieve the above proportion, the raster image processor 12 may use a reduced dot density of 87% for the first inks 35, 37 (C,M,Y,W), and the normal dot density of 100% for the second ink 39 (K) for printing the sub-layers 72 (steps S6, S7).

As the curing expansion/shrinkage properties of the used inks are needed to be known only in relation to each other, they may be determined experimentally using the following procedure. For each ink to be tested, the same defined test structure of a defined thickness is printed on a defined receiving substrate sample, and a resulting deflection may be measured in a configuration similar to the example of FIG. 4. From the experiment, the curing expansion/shrinkage properties of the inks may be determined relative to each other. Thus, the resulting deflection of the test products are used as an indication for the underlying mechanical stress between the printing structure and the receiving material 20, which in turn is an indication for the curing shrinkage or, respectively, curing expansion.

Figure 6:
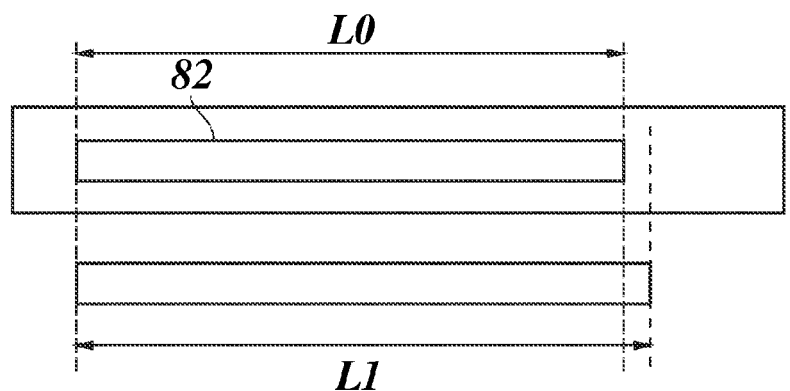
FIG. 6 is a schematic illustration of the method for measuring a lateral expansion of a printed structure.

Furthermore, a curing expansion or a curing shrinkage of a printed film may be directly measured as described in connection with FIG. 6. A multilayer structure in the form of a strip 82 having a length L0 is printed on a stainless steel strip prepared to create a minimal adhesion between the ink and the steel. After printing the strip 82, the length L0 of the strip is exactly measured. The strip is carefully removed from the steel strip. After e.g. 24 hours, the length L1 of the strip 82 is measured. The curing expansion may be determined as (L1−L0)/L0.

When measuring the curing expansion/shrinkage, thermal effects included in the measured values will typically be negligible and/or cancel each other out to the extent to which they are similar for the different inks.

Third Example

Figure 7:
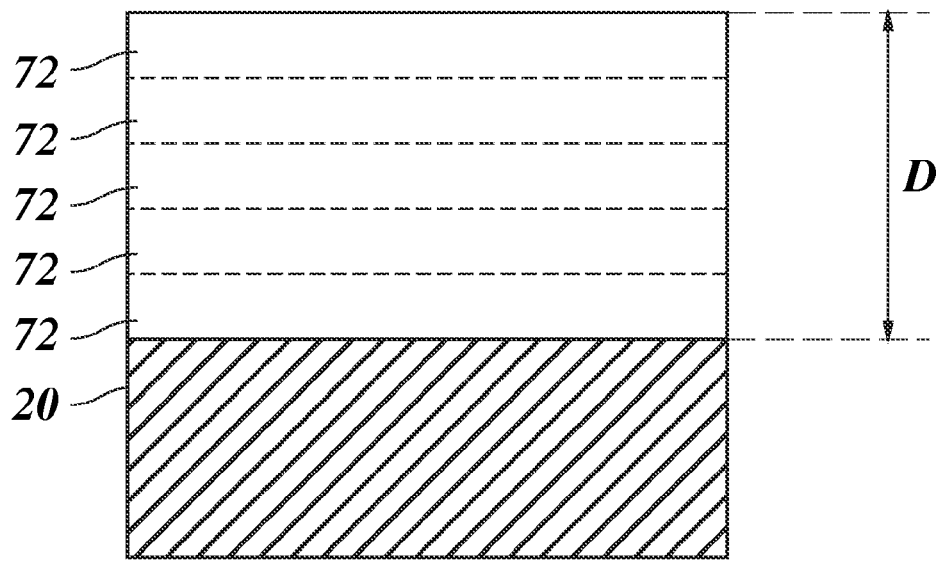
FIG. 7 is a schematic illustration of a further 2.5D print.

FIG. 7 shows a third example. A multilayer structure is printed on a receiving material 20. In this example, the combined effects of the curing expansion/shrinkage properties and thermal expansion of the inks is minimized for a target temperature of e.g. 70° C. For example, the target temperature is a temperature within a usage temperate range of the resulting product. For example, the receiving material 20 is polycarbonate having a linear thermal expansion coefficient of 0.07 mm/m K.

For example, the linear thermal expansion coefficients of the inks may be measured using e.g. a test strip prepared as explained above with FIG. 6. For example, the linear thermal expansion coefficient of the first ink, Océ IJC255, is: 0.15 mm/m K. The linear thermal expansion coefficient of the second ink, IJC256, is: 0.22 mm/m K.

Thus, the thermal expansion of the inks relative to the polycarbonate, between a printing temperature of e.g. 40° C. and a target temperature of 70° C. is: (0.22−0.07) mm/m K×(70−40° C.=4.5 mm/m for IJC256 ink, and (0.15−0.07) mm/m K×(70−40° C.=2.4 mm/m for IJC255 ink.

The curing expansion of IJC256 is 20 mm/m, and the curing expansion of IJC255 is −4 mm/m.

Thus, a proportion of the amount of the second ink 39 IJC256 and the amount of the first inks 35, 37 IJC255 may be determined as explained above, wherein the value of the curing expansion is to be replaced by the combined value of curing expansion and thermal expansion relative to the receiving material, i.e.
(2.4−4) mm/m=−1.6 mm/m for the ink IJC255, and
(20+4.5) mm/m=24.5 mm/m for the ink IJC256.

By taking into account the combined expansion/shrinkage effects of the curing and the thermal expansion, a proportion of approximately 10% of the second ink to 90% of the first inks used for printing the complete multilayer structure may be determined such that the effect of the first inks C, M, Y, W to cause expansion/shrinkage mechanical stress between the printed multilayer structure and the receiving material 20 is substantially counterbalanced by an opposing effect of the second ink K. Thus, although the linear thermal expansion coefficient of both kinds of inks is larger than the linear thermal expansion coefficient of the receiving material, the overall expansion/shrinkage effects of the inks may compensate each other due to the curing shrinkage of the first inks.

In particular, four inks C, M, Y, W are printed with a dot density of 100%, and the second ink K is printed with a dot density of 30%. With 30%/430%=0.07, the curing expansion is: (0.93×−0.4%)+(0.07×2%)=−0.232%, or −2.3 mm/m.

The combined effect of curing expansion and thermal expansion of the multilayer structure relative to the receiving material is approximately 2.5 mm/m+(−2.3) mm/m=0.2 mm/m. Thus, the mechanical stress at the target temperature is substantially reduced.

Fourth Example

Figure 8:
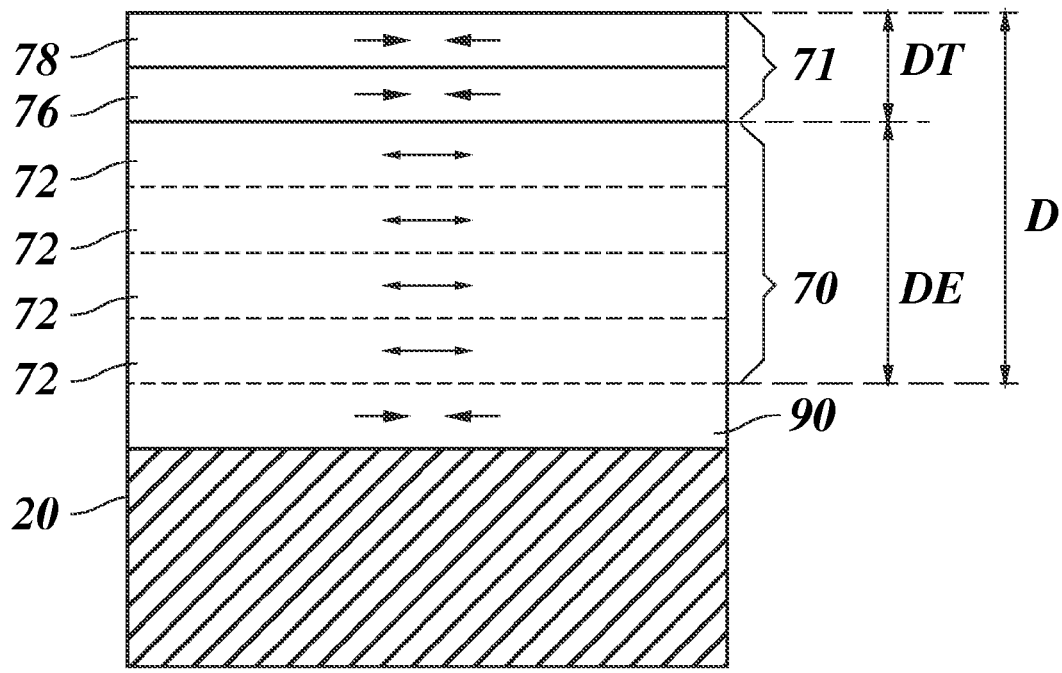
FIG. 8 is a schematic illustration of a further 2.5D print having an adhesion layer.

FIG. 8 shows a further example, which is similar to that of FIG. 2. However, in addition to the elevation layer 70 and top layer 71, the multilayer structure further includes an adhesion layer 90.

At least one first ink 35, 37 has been selected for printing the adhesion layer 90 (step S4). The adhesion layer 90 is printed directly onto the receiving material 20. The ink for printing the adhesion layer is selected in dependence on information about the adhesion properties 46 of the ink and the adhesion properties 54 of the receiving material 20, which are stored in the ink property memory unit 40 and the receiving material property memory unit 50, respectively. In particular, an adhesion layer ink may be selected which has the best adhesion properties on the respective receiving material.

In addition to the top layer, the adhesion layer 90 is also taken into account when selecting the compensation ink K and determining the proportion of the inks for being used for printing the elevation layer 70.

Although the above examples, for simplification of the explanation, describe two different types of inks, wherein in each group of inks, the curing expansion/shrinkage behaviour is substantially equal, more than two different types of inks may be used.

Although the proportion of the inks to be used for printing may be directly calculated by the proportion determining units 62, respective predetermined proportions may be stored in the print data processing system for one or more sample heights D, for usage with the associated inks.

Although the above examples describe the printing of a structure having a specific constant height D, the method may be accordingly used for printing a multilayer structure having an average height D, and/or for printing a multilayer structure that is laterally composed of portions, each portion having an individual average or constant height D. Thus, the method may be easily applied to printing of complex 2.5D prints, such as relief prints.

In addition to the above examples, the expansion/shrinkage properties of the inks stored in the ink property memory unit 40 may also take into account printing conditions, such as a humidity measured or typically present in the printing system, e.g. in relation to target environmental conditions. For example, the target environment condition may comprise a different humidity. Thus, the curing expansion/shrinkage property information 42 may include an expansion/shrinkage effect due to releasing or absorbing humidity.

Whereas the above examples relate to printing of multilayer structures of thin films and allow to reduce a deflection of the product due to mechanical stress, other receiving materials may also be used. For example, a thick receiving material may be used. In this case, the selection of a compensation ink may reduce or minimize mechanical stress between the printed structure and the receiving material, which otherwise could lead to a detachment of the printed structure from the material. For example, the receiving substrate 20 may be a stiff form board, e.g. a laminated structure of a form board with face veneers.

In the above examples, the print data processing unit is adapted to construct layer information from the print data information. However, the print data information may already include layer information. For example, the height information may comprise information about a layer structure of the multilayer structure, e.g. a number of layers.

In the example of FIG. 8, a compensation ink for compensation an expansion/shrinkage effect of the first inks is selected, and an adhesion layer ink for printing an adhesion layer 90 is selected. However, different from the example, only one of these selections may take place. For example, irrespective of expansion/shrinkage properties of the inks, an ink may be selected for printing an adhesion layer of a multilayer structure.

What is claimed is:

1. A method of printing a multilayer structure using radiation curable ink, the multilayer structure comprising multiple ink layers, which are consecutively printed, and wherein a first printed ink layer of any two consecutively printed ink layers is cured before a subsequently printed ink layer is printed thereon, the method comprising the steps of:
   (a) selecting at least one ink of multiple inks for being used for printing the multilayer structure, said multiple inks comprising at least one first radiation curable ink and at least one second radiation curable ink, wherein said at least one ink is selected in dependence on information about an expansion/shrinkage property of the said at least one ink, and
   (b) printing the multilayer structure onto a receiving material, comprising printing and curing a plurality of ink layers, wherein, of the multiple inks, at least the selected at least one ink and at least one of the at least one first ink and at least one second ink are used for printing the multilayer structure,
   wherein an effect of the at least one first ink to cause expansion/shrinkage mechanical stress between the multilayer structure and the receiving material is at least partly compensated by an opposing effect of the at least one selected ink.

2. The method according to claim 1, wherein the step of printing the multilayer structure comprises printing an elevation layer and printing a top layer of the multilayer structure, wherein the top layer comprises an image layer, and wherein, of the multiple inks, at least the selected at least one ink is used for printing the elevation layer, and at least one of the at least one first ink is used for printing the image layer, wherein the image layer is printed according to image data.

3. The method according to claim 1, wherein a proportion of the amount of the at least one selected ink to the amount of the at least one first ink to be used for printing at least one layer of the multilayer structure is determined in dependence on an expansion/shrinkage property of the said at least one ink.

4. The method according to claim 3, wherein the step of printing the multilayer structure comprises setting ink density levels of the respective inks for printing said at least one layer, wherein the ink density levels are set in accordance with the determined proportion.

5. The method according to claim 1, wherein the step of selecting at least one ink comprises selecting at least one ink in dependence on information about a thermal expansion/shrinkage property of the receiving material.

6. The method according to claim 1 for printing a multilayer structure according to image data and height data using radiation curable ink, wherein the step of printing the multilayer structure comprises printing at least one sub-layer that forms an elevation layer, and printing a top layer of the multilayer structure, wherein the top layer comprises an image layer, and wherein, of the multiple inks, at least the selected at least one ink is used for printing the elevation layer, and at least one of the at least one first ink is used for printing the image layer,
   wherein the number of sub-layers forming the elevation layer is determined in dependence on the height data,
   wherein a proportion of the amount of the at least one selected ink to the amount of the at least one first ink to be used for printing the elevation layer is determined in dependence on the expansion/shrinkage property of the selected at least one ink, and
   wherein the image layer is printed according to the image data.

7. The method according to claim 1, wherein said information about an expansion/shrinkage property comprises information about a curing expansion/shrinkage property of the selected at least one ink and information about a thermal expansion/shrinkage property of the selected at least one ink.

8. The method according to claim 1, wherein said information about an expansion/shrinkage property of the selected at least one ink comprises information about a curing expansion/shrinkage property, and
   wherein said selected at least one first ink has the property to expand or shrink during radiation curing, and wherein said at least one second ink has an opposing property to shrink or, respectively, to expand during curing.

9. The method according to claim 1, wherein the step of printing the multilayer structure comprises printing an elevation layer and printing a top layer of the multilayer structure, wherein the top layer comprises an image layer and a uniformly colored cover layer that covers the elevation layer, and wherein the image layer is printed on to the cover layer, the cover layer separating the image layer from the elevation layer.

10. The method according to claim 1, further comprising the step of:
    selecting at least one ink of said multiple inks for printing an adhesion ink layer, wherein said at least one ink is selected in dependence on information about an adhesion property of the at least one ink and information about an adhesion property of the receiving material,
    wherein the step of printing the multilayer structure comprises printing an adhesion layer on the receiving material, the adhesion layer forming a bottom layer of the multilayer structure connecting the multilayer structure to the receiving material.

11. A printing system for printing a multilayer structure using radiation curable ink, comprising:
    a print engine;
    multiple ink supply systems for supplying respective inks to the print engine, said inks comprising at least one first radiation curable ink and at least one second radiation curable ink;
    a radiation curing device; and
    a print data processing system adapted to control the print engine in accordance with print data, wherein the print data processing system comprises an ink property memory unit adapted for storing information characterizing at least one property of the respective inks apart from color, said at least one property comprising an expansion/shrinkage property of the respective inks, wherein the print data processing system is adapted to control the print engine to print a multilayer structure, wherein the multilayer structure comprises multiple ink layers which are consecutively printed, wherein a first printed ink layer of any two consecutively printed ink layers is cured before a subsequently printed ink layer is printed thereon, and wherein the print data processing system comprises an ink selector unit adapted for selecting at least one ink of the multiple inks in dependence on information about the expansion/shrinkage property of the ink, for printing the multilayer structure, such that an effect of a first ink of the multiple inks to cause expansion/shrinkage mechanical stress between the multilayer structure and the receiving material is at least partly compensated by an opposing effect of the at least one selected ink.

12. The printing system according to claim 11,
wherein the print data processing system comprises a proportion determining unit adapted for determining a proportion of an amount of the at least one selected ink to an amount of the at least one first ink to be used for printing at least one layer of the multilayer structure, wherein said proportion is determined in dependence on the expansion/shrinkage property of the ink.

13. The printing system according to claim 12, further comprising a raster image processing unit for converting print data into a format suitable for driving the print engine, wherein the proportion determining unit is adapted for controlling the raster image processing unit to apply ink density levels of the respective inks for printing said at least one layer, wherein the ink density levels are set in accordance with the determined proportion.

* * * * *